United States Patent
Oechslen

(10) Patent No.: US 11,355,992 B2
(45) Date of Patent: Jun. 7, 2022

(54) ELECTRIC MACHINE

(71) Applicant: Dr. Ing. h.c. F. Porsche Aktiengesellschaft, Stuttgart (DE)

(72) Inventor: Stefan Oechslen, Stuttgart (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 70 days.

(21) Appl. No.: 16/920,909

(22) Filed: Jul. 6, 2020

(65) Prior Publication Data
US 2021/0006120 A1    Jan. 7, 2021

(30) Foreign Application Priority Data

Jul. 3, 2019  (DE) ...................... 10 2019 117 948.3

(51) Int. Cl.
H02K 5/15        (2006.01)
H02K 5/173       (2006.01)
F16C 35/07       (2006.01)
H02K 7/08        (2006.01)

(52) U.S. Cl.
CPC .......... *H02K 5/1732* (2013.01); *F16C 35/07* (2013.01); *H02K 7/083* (2013.01); *F16C 2202/30* (2013.01); *F16C 2380/26* (2013.01)

(58) Field of Classification Search
CPC ...... H02K 5/1732; H02K 7/083; F16C 35/07; F16C 2202/30; F16C 2380/26
USPC ......................................................... 310/90
See application file for complete search history.

(56) References Cited

U.S. PATENT DOCUMENTS

| 473,367 A | * | 4/1892 | Short | H02K 23/40 310/40 R |
|---|---|---|---|---|
| 10,401,710 B2 | * | 9/2019 | Wilson | F16M 13/02 |
| 2003/0169953 A1 | | 9/2003 | Schelbert | |
| 2008/0258576 A1 | | 10/2008 | Oh et al. | |
| 2013/0033139 A1 | * | 2/2013 | Tones | H02K 5/124 310/90 |

(Continued)

FOREIGN PATENT DOCUMENTS

| DE | 80 29 066 | 10/1980 |
|---|---|---|
| DE | 11 00 597 | 7/1992 |

(Continued)

OTHER PUBLICATIONS

Japanese Office Action dated Jun. 24, 2021.

(Continued)

*Primary Examiner* — Terrance L Kenerly
(74) *Attorney, Agent, or Firm* — Gerald E. Hespos; Michael J. Porco; Matthew T. Hespos

(57) ABSTRACT

An electric machine (10) has a rotor (15) and a stator (11). The rotor (15) has a rotor shaft (16) and a rotor laminated core (17). The stator (11) has a housing (12) with a housing cover (14) and a stator laminated core (13). The rotor shaft (16) is mounted rotatably in the housing (12) via bearings (18, 19). Each bearing (18, 19) has a bearing inner ring (18a, 19a) that bears against the rotor shaft (16), and a bearing outer ring (18b, 19b) that bears against the housing (12). Sections (24) of the housing (12) against which the respective bearing outer ring (18b, 19b) bears are formed from a light metal alloy material or a light metal material that has a transformed material structure such that the housing (12) is of electrically insulating configuration in these sections (24).

13 Claims, 4 Drawing Sheets

(56) References Cited

U.S. PATENT DOCUMENTS

2013/0301971 A1 11/2013 Cudrnak et al.
2016/0020681 A1 1/2016 Henger et al.
2017/0284468 A1 10/2017 White

FOREIGN PATENT DOCUMENTS

| DE | 100 37 423     | 2/2002  |
| DE | 10 2014 213 698 | 1/2016  |
| DE | 11 2017 001 908 | 12/2018 |
| JP | 10-75551       | 3/1998  |
| JP | 2010-525787    | 7/2010  |
| JP | 2013-85441     | 5/2013  |

OTHER PUBLICATIONS

Leichtbau BW GmbH: Neuartige elektrochemische Mikroplasma-Umwandlung ermoeglicht Design von Leichtmetall-Oberflaechen entsprechend gewuenschter Funktionen, Jan. 23, 2017, S. 1-2, Clusterportal Baden-Wuertlemberg [online], In:https://www.clusterportal-bw.de/aktuelles/pressemitteilungen/presse-detailseite/news/neuartige-elektrochemische-mikroplasma-umwandlung-ermoeglicht-design-von-leichtmetall-oberflaechen-ent/.

* cited by examiner

ELECTRIC MACHINE

CROSS REFERENCE TO RELATED APPLICATION

This application claims priority under 35 USC 119 to German Patent Appl. No. 10 2019 117 948.3 filed on Jul. 3, 2019, the entire disclosure of which is incorporated herein by reference.

BACKGROUND

Field of the Invention

The invention relates to an electric machine.

Related Art

An electric machine has a stator, a rotor and bearings. The stator has a housing with a housing cover and a stator laminated core. The stator also is called a stator coil. The rotor has a rotor shaft and a rotor laminated core. The rotor is also called a runner. The bearings are used to mount the rotor shaft of the rotor rotatably in the housing of the stator. The bearings are typically anti-friction bearings, such as ball bearings. A locating bearing typically is used at one axial end of the rotor shaft, and a floating bearing is used at an opposite end of the rotor shaft.

Bearing currents, i.e. electric currents that flow over the bearings of an electric machine, can form at the electric machine, for example, as a result of high switching frequencies. The bearing currents can damage running faces of the bearings, for example, as a result of electro-erosion. This leads to rapid wear of the bearings and thus to rapid failure of the electric machine.

Ceramic bearings can be used to avoid damage to bearings as a result of bearing currents. However, ceramic bearings are expensive.

A rotor shaft grounding ring can be installed on an electric machine to ground the rotor shaft. The rotor shaft grounding ring discharges electric currents in a defined manner to avoid bearing currents that can lead to damage of the bearings. DE 10 2014 213 698 discloses an electric machine with a rotor shaft grounding means.

US 2013/0301971 A1 discloses a bearing for electric machines with an electrically conductive sealing element arranged between the bearing inner ring and the bearing outer ring of the respective bearing to conduct bearing currents past the rolling bodies of the bearing.

There is a requirement for an improved electric machine that can simply and reliably avoid bearing currents that can lead to damage of the bearing.

It is an object of the invention to provide a novel electric machine that can avoid the occurrence of bearing currents in a simple and reliable manner.

SUMMARY

In accordance with a first aspect of the invention, sections of the housing against which the respective bearing outer ring bears is manufactured from a light metal alloy material or a light metal material that has a transformed material structure such that the housing is of electrically insulating configuration in sections.

In accordance with a second aspect of the invention, sections of the rotor shaft against which the respective bearing inner ring bears may be manufactured in sections from a light metal alloy material or a light metal material that has a transformed material structure such that the rotor shaft is of electrically insulating configuration in said sections.

These two aspects of the invention can be utilized in combination with one another and enable conventional bearings to be used in electric machines. These conventional bearings are substantially less expensive than ceramic bearings.

These aspects of the invention avoid the flow of bearing currents via the bearings, namely via the bearing bodies and running faces for the bearing bodies. Thus, damage of the bearings is prevented. The housing and/or the rotor shaft are electrically insulating in sections due to the transformation of the material structure of the light metal material or light metal alloy material. A rotor shaft grounding ring also may be used to provide a defined current path and to avoid having bearing currents flow via gearwheels and bearings of a transmission that interacts with the electric machine. Thus, damage to gearwheels and bearings of a transmission are avoided.

The light metal alloy material or light metal material that has a transformed material structure may be an aluminum alloy or aluminum material that forms an electrically insulating functional layer on its edge layer region. The use and transformation of the material structure of an aluminum material or aluminum alloy material configures an electrically insulating functional layer on an edge region of the material via the transformation of the material structure.

The material structure of the light metal material or light metal alloy material may be transformed using plasma electrochemistry with the configuration of a functionally graded material with the electrically insulating functional layer in the edge layer region. The transformation of the material structure using plasma electrochemistry configures the electrically insulating functional layer in the edge layer region of the light metal material or light metal alloy material with the configuration of the functionally graded material.

DETAILED DESCRIPTION

Figure 1:
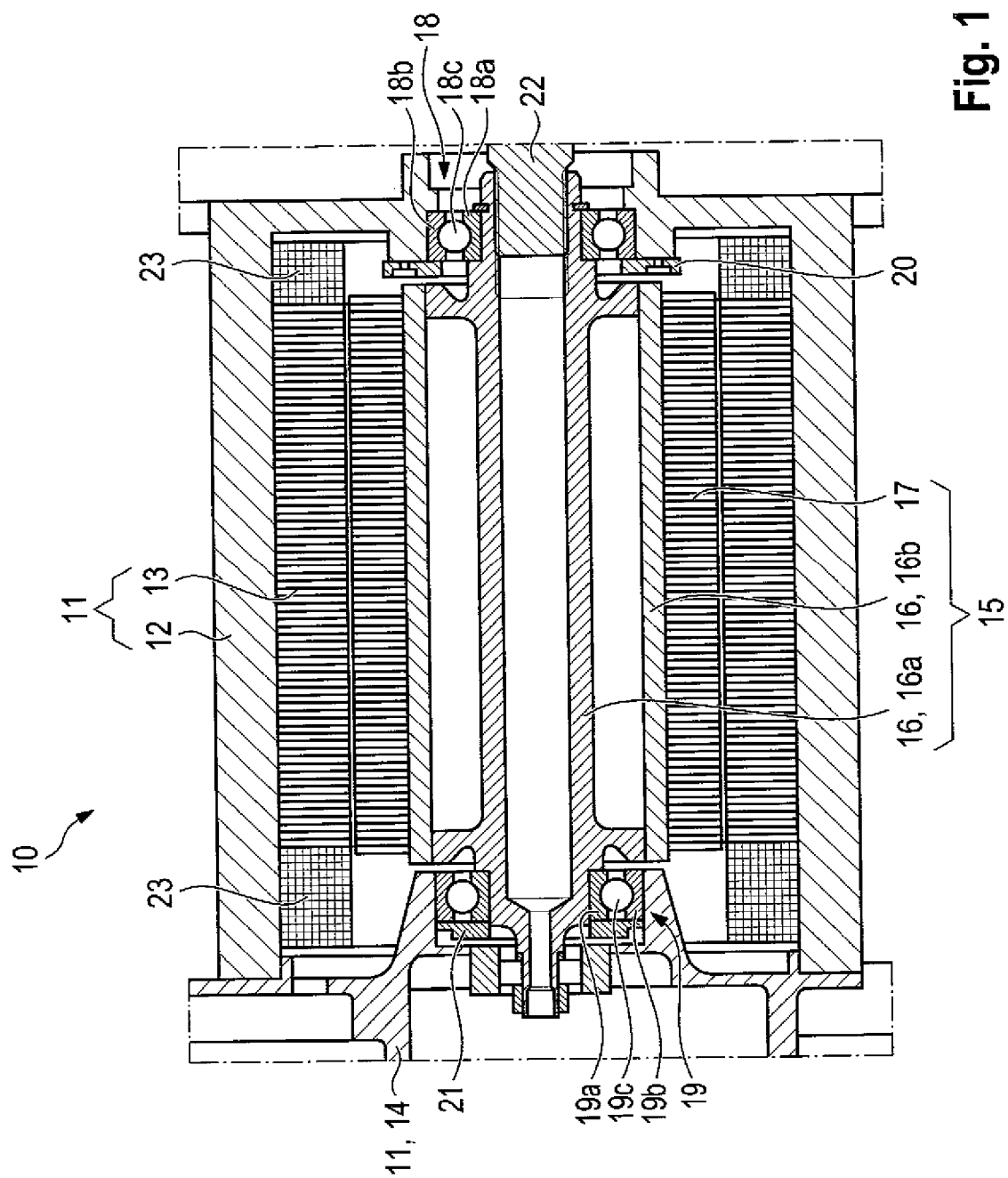
FIG. 1 shows a cross section through an electric machine in axial section.
Figure 2:
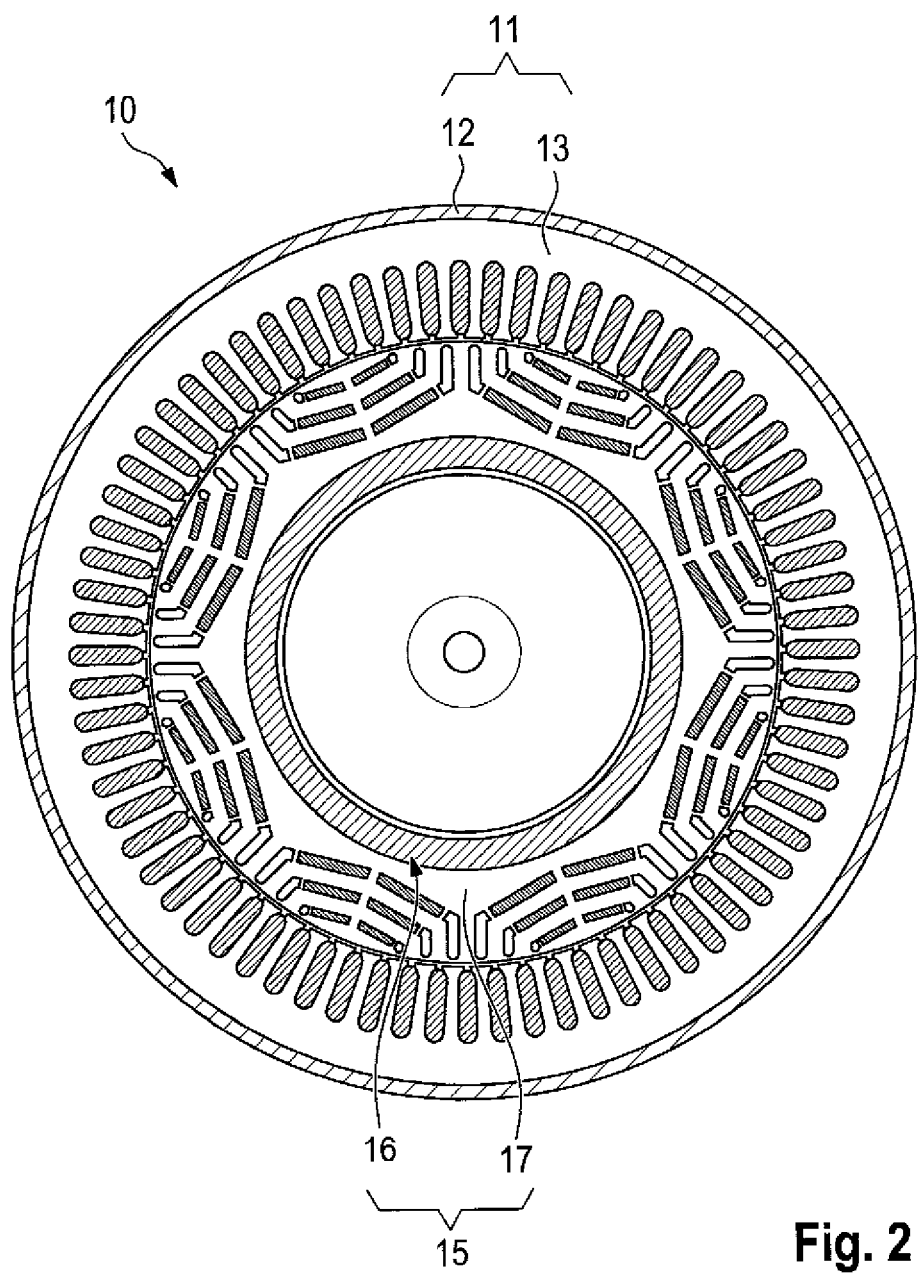
FIG. 2 shows a cross section through an electric machine in radial section.

FIGS. 1 and 2 show cross sections through an electric machine 10. The electric machine 10 has a stator 11 with a housing 12 and a stator laminated core 13. The housing 12 has a housing cover 14 that closes the housing 12 on one side of the stator 11. The electric machine 10 also has a rotor 15. The rotor 15 has a rotor shaft 16 with a radially inner section 16a and a radially outer section 16b, and a rotor laminated core 17. An air gap exists between the rotor laminated core 17 and the stator laminated core 13.

As shown in FIG. 1, the rotor shaft 16 of the rotor 15 is mounted rotatably via bearings 18, 19 in the housing 12 of the stator 11. The bearings 18, 19 are anti-friction bearings, preferably groove ball bearings. Each of the bearings 18 and 19 has a bearing inner ring 18a and 19a, respectively, and a bearing outer ring 18b and 19b, respectively. Mutually facing faces of the bearing rings 18a, 18b and 19a, 19b provide running faces for rolling bodies 18c and 19c of the respective bearing 18 and 19, respectively, with rolling bodies being balls in the case of groove ball bearings.

The bearing 18 shown on the right side in FIG. 1 is a locating bearing that is secured in its axial position via an axial fixing means 20. The bearing 19 arranged on the opposite side in FIG. 1 is a floating bearing that is pre-stressed in the axial direction via a zigzag spring 21.

The bearing inner ring 18a and 19a of the respective bearing 18 and 19 bears against the rotor shaft 16, namely against an axial end of the radially inner section 16a of the rotor shaft 16. The respective bearing outer ring 18b and 19b bears against the stator 11; namely, the bearing outer ring 18b of the bearing 18 bears against a section of the housing 12, and the bearing outer ring 19b of the bearing 19 bears against a section of the housing cover 14.

FIG. 1 also shows a coupling of the rotor shaft 16 to an output shaft 22. The output shaft 22 has an external spline system at one end section. The external spline system engages into an internal spline system of the rotor shaft 16. Furthermore, winding heads 23 of the stator winding that lies in the stator laminated core 13 can be seen in FIG. 1.

Figure 3:
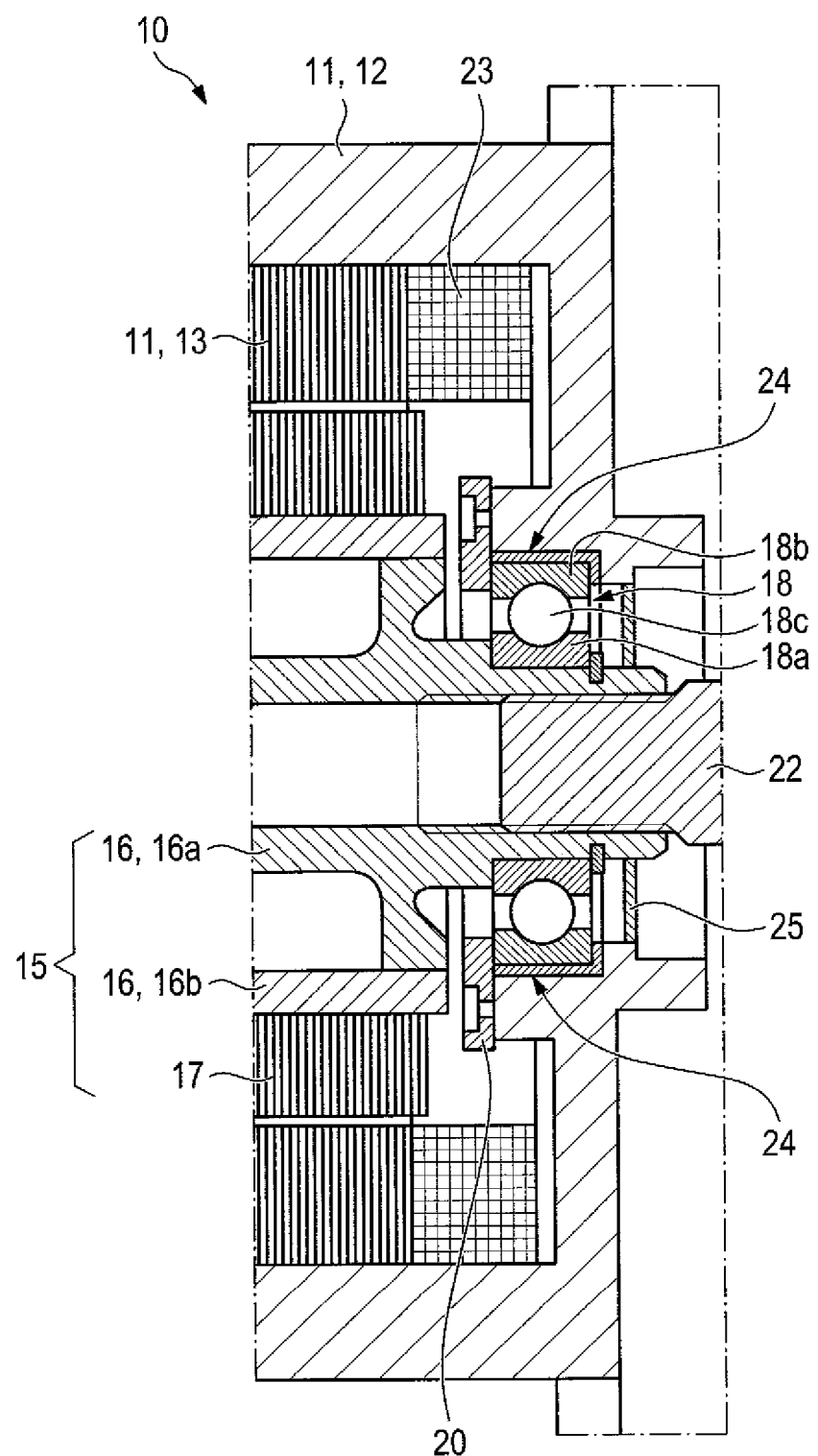
FIG. 3 shows a detail from FIG. 1 in the case of an electric machine in accordance with the first aspect of the invention.

FIG. 3 shows one embodiment of the electric machine 10 in accordance with a first aspect of the invention. In accordance with the first aspect of the invention, the housing 12 has sections 24 in which a bearing outer ring 18b and 19b of the respective bearing 18 and 19 bears against the housing 12. These sections 24 comprise a light metal alloy material or a light metal material with a transformed material structure such that the housing 12 is electrically insulating in the sections 24 of the housing 12.

FIG. 3 shows the region of the bearing 18 configured as a locating bearing. The region of the housing cover 14 of the housing 12 with the floating bearing 19 against which the bearing outer ring 19b of the bearing 19 bears also may be of a light metal alloy material or light metal material that has a transformed material structure.

The housing 12 preferably is manufactured from an aluminum material or aluminum alloy material. The aluminum material or aluminum alloy material has an electrically insulating functional layer on its edge layer region in the sections 24.

A functionally graded material is provided by way of the transformation of the material structure of the light metal material or light metal alloy material, in particular of the aluminum material or aluminum alloy material. This functionally graded material forms the electrically insulating functional layer in its edge layer region in the sections 24. In particular, a plasma electrochemical transformation of the material structure is suitable for the transformation of the material structure of the aluminum material or aluminum alloy material or else other light metal materials. Plasma electrochemical transformation of the material structure is known from METAKER Surface methods.

The invention performs a transformation of the material structure of this type on sections of an electric machine that are in contact with bearings to provide electric insulation and to prevent bearing currents from flowing via the bearings 18 and 19 and running faces of the bearings for the bearing bodies being damaged as a consequence of the bearing currents and as a consequence of electro-erosion.

The electric machine also has a rotor shaft grounding ring 25 to ground the rotor shaft 16 and thus to provide a defined current path. As a result, electric currents will not flow via gearwheels and bearings of the transmission that is coupled to the rotor shaft 16 to avoid damage there as a consequence of electro-erosion.

The first aspect of the invention can be used in the region of a single bearing or two bearings. More particularly, the housing 12 can have a section 24 consisting of the light metal alloy material or light metal material that has a transformed metal structure in the region of the bearing 18 and/or in the region of the bearing 19 to provide the electric insulation for the respective bearing 18, 19. The use of a single rotor shaft grounding ring 25 is sufficient, however.

Figure 4:
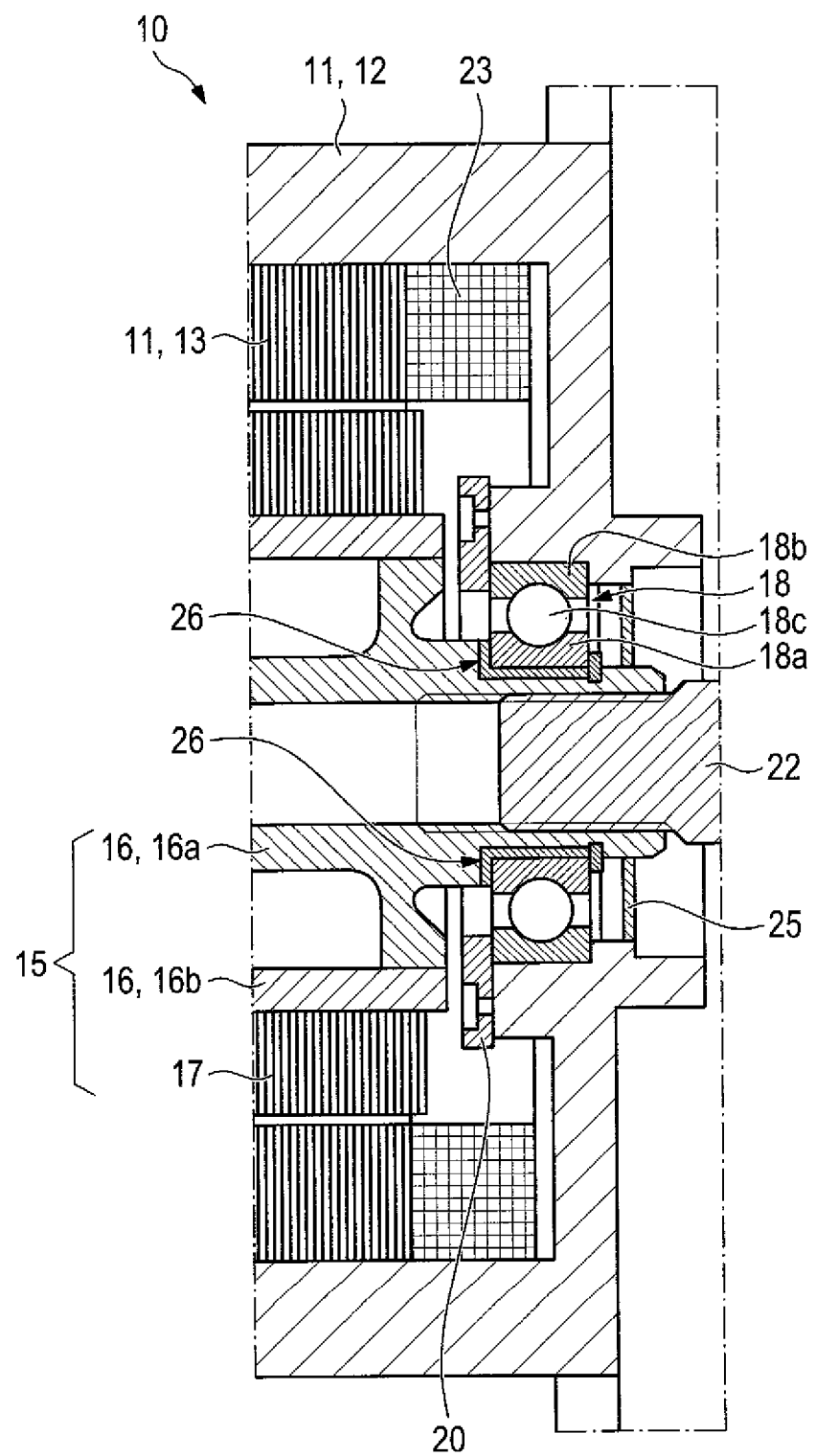
FIG. 4 shows a detail from FIG. 1 in the case of an electric machine in accordance with the second aspect of the invention.

FIG. 4 shows a detail of an electric machine 10 in the region of the bearing 18 that is configured as a locating bearing in accordance with the second aspect of the invention. In accordance with the second aspect of the invention the radially inner part 16a of the rotor shaft 16 is manufactured in sections 26 in which the respective bearing inner ring 18a of the bearing 18 bears against the rotor shaft 16. These sections 26 are made from a light metal alloy material or a light metal material that has a transformed material structure such that the rotor shaft 16 is of electrically insulating configuration in said sections 26. Thus, bearing currents will not flow via the bearing 18. The shaft grounding ring 25 also may be used in this case.

It is also possible to combine the two aspects of the invention with one another.

It is possible by way of the invention to avoid a premature failure of the bearings on an electric machine. Bearing currents flow via the bearings and damage running faces of the bearings as a consequence of electro-erosion are avoided by way of the invention without using expensive ceramic bearings. The invention utilizes a transformation of the material structure of a light metal material or a light metal alloy material. In addition, a rotor shaft grounding ring also preferably is used. As a result of the transformation of the material structure, the respective sections are not only electrically insulating, but also are corrosion-resistant and abrasion-resistant.

What is claimed is:

1. An electric machine, comprising: a rotor with a rotor shaft and a rotor laminated core; a stator having a housing with a housing cover and a stator laminated core, the housing being manufactured from a light metal alloy material or a light metal material; and bearings via which the rotor shaft is mounted rotatably in the housing, each bearing having a bearing inner ring that bears against a bearing surface of the rotor shaft, and a bearing outer ring that bears against a bearing surface of the housing, wherein A section of the housing that includes the bearing surface of the housing is subjected to a plasma electrochemical process to define a transformed material structure that is transformed relative to sections of the housing remote from the bearing surface of the housing, the transformed material structure being electrically insulating.

2. The electric machine of claim 1, further comprising at least one rotor shaft grounding ring for grounding the rotor shaft.

3. The electric machine of claim 1, wherein the light metal alloy material or light metal material that has a transformed material structure is an aluminum alloy or aluminum material.

4. The electric machine of claim 1, wherein the light metal alloy material or light metal material that has a transformed material structure forms an electrically insulating functional layer on its edge layer region.

5. The electric machine of claim 1, wherein the light metal alloy material or light metal material that has a transformed material structure is a functionally graded material.

6. The electric machine of claim 1, wherein the material structure of the light metal material or light metal alloy material is transformed using plasma electrochemistry.

7. An electric machine, comprising: a rotor with a rotor shaft and a rotor laminated core, the rotor being manufactured from a light metal alloy material or a light metal material; a stator having a housing with a housing cover and a stator laminated core; and bearings via which the rotor shaft is mounted rotatably in the housing, each bearing having a bearing inner ring that bears against a bearing surface of the rotor shaft, and a bearing outer ring that bears against a bearing surface of the housing, wherein a section of the rotor shaft that includes the bearing surface of the rotor shaft is subjected to a plasma electrochemical process to define a transformed material structure that is transformed relative to sections of the rotor shaft remote from the bearing surface of the rotor shaft, the transformed material structure being electrically insulating.

8. The electric machine of claim 7, further comprising at least one rotor shaft grounding ring for grounding the rotor shaft.

9. The electric machine of claim 7, wherein the light metal alloy material or light metal material that has a transformed material structure is an aluminum alloy or aluminum material.

10. The electric machine of claim 7, wherein the light metal alloy material or light metal material that has a transformed material structure forms an electrically insulating functional layer on its edge layer region.

11. The electric machine of claim 7, wherein the light metal alloy material or light metal material that has a transformed material structure is a functionally graded material.

12. The electric machine of claim 7, wherein the material structure of the light metal material or light metal alloy material is transformed using plasma electrochemistry.

13. The electric machine of claim 7, wherein a section of the housing that includes the bearing surface of the housing has a transformed material structure that is transformed relative to sections of the housing remote from the bearing surface of the housing, the transformed material structure of the housing being electrically insulating so that sections of both the rotor shaft and the housing that include the respective bearing surfaces have the transformed material structures that are electrically insulating.

* * * * *